US010673616B2

(12) United States Patent
Cammarota et al.

(10) Patent No.: US 10,673,616 B2
(45) Date of Patent: Jun. 2, 2020

(54) LIGHTWEIGHT MITIGATION AGAINST FIRST-ORDER PROBING SIDE-CHANNEL ATTACKS ON BLOCK CIPHERS

(71) Applicant: QUALCOMM Incorporated, San Diego, CA (US)

(72) Inventors: Rosario Cammarota, San Diego, CA (US); Indranil Banerjee, San Diego, CA (US); Matthew McGregor, El Segundo, CA (US)

(73) Assignee: Qualcomm Incorporated, San Diego, CA (US)

( * ) Notice: Subject to any disclaimer, the term of this patent is extended or adjusted under 35 U.S.C. 154(b) by 63 days.

(21) Appl. No.: 15/404,056

(22) Filed: Jan. 11, 2017

(65) Prior Publication Data

US 2018/0198603 A1 Jul. 12, 2018

(51) Int. Cl.
*H04L 9/00* (2006.01)
*H04L 9/14* (2006.01)
*H04L 9/06* (2006.01)
*H04L 9/32* (2006.01)

(52) U.S. Cl.
CPC ............ *H04L 9/0631* (2013.01); *H04L 9/002* (2013.01); *H04L 9/003* (2013.01); *H04L 9/0625* (2013.01); *H04L 9/14* (2013.01); *H04L 9/32* (2013.01); *H04L 9/0618* (2013.01)

(58) Field of Classification Search
CPC ....... H04L 9/003; H04L 9/004; H04L 1/0057; H04L 9/0618; H04L 9/0631; H04L 9/002; H04L 9/0625; H04L 9/14; H04L 9/32; G06F 21/556; G06F 21/75; G06F 11/10; H03M 13/116; G09C 1/00

See application file for complete search history.

(56) References Cited

U.S. PATENT DOCUMENTS

| 5,727,062 | A | * | 3/1998 | Ritter | .................. H04L 9/0618 380/37 |
|---|---|---|---|---|---|
| 8,155,317 | B2 | | 4/2012 | Motoyama | |
| 8,332,634 | B2 | | 12/2012 | Derouet | |
| 9,215,075 | B1 | * | 12/2015 | Poltorak | ................ H04L 63/04 |
| 2003/0012372 | A1 | | 1/2003 | Cheng | |
| 2007/0076864 | A1 | | 4/2007 | Hwang | |

(Continued)

FOREIGN PATENT DOCUMENTS

| EP | 1802024 A2 | 6/2007 |
|---|---|---|
| EP | 2458774 A1 | 5/2012 |

(Continued)

OTHER PUBLICATIONS

International Search Report and Written Opinion—PCT/US2017/067518—ISA/EPO—dated Mar. 21, 2018.

*Primary Examiner* — Alexander Lagor
*Assistant Examiner* — Howard H. Louie
(74) *Attorney, Agent, or Firm* — Hunter Clark PLLC (57) ABSTRACT

Techniques for mitigating side-channel attacks on cryptographic algorithms are provided. An example method according to these techniques includes applying a block cipher algorithm to an input data to generate a cryptographic output, such that applying the block cipher to input data comprises modifying an output of a stage of the block cipher algorithm such that each output of the stage of the block cipher algorithm has a constant Hamming weight, and outputting the cryptographic output.

22 Claims, 5 Drawing Sheets

```
                                          ┌─ 505
┌─────────────────────────────────────────────────────┐
│ Determine a Hamming weight of an output of the stage of │
│           the block cipher algorithm                 │
└─────────────────────────────────────────────────────┘
                          │
                          ▼
                                          ┌─ 510
┌─────────────────────────────────────────────────────┐
│ Determine a weight difference between the Hamming weight │
│   of the output and a constant output weight value    │
└─────────────────────────────────────────────────────┘
```

(56) References Cited

U.S. PATENT DOCUMENTS

| | | | |
|---|---|---|---|
| 2012/0072737 A1* | 3/2012 | Schrijen | H04L 9/3278 713/189 |
| 2014/0298458 A1 | 10/2014 | Lewis et al. | |
| 2016/0012255 A1* | 1/2016 | Bringer | G06K 19/07309 713/189 |
| 2016/0050065 A1 | 2/2016 | Michiels et al. | |
| 2016/0105276 A1 | 4/2016 | Brumley et al. | |
| 2017/0359165 A1* | 12/2017 | Liu | G06F 21/556 |

FOREIGN PATENT DOCUMENTS

| | | | |
|---|---|---|---|
| JP | 2014153552 A | 8/2014 | |
| WO | WO2017216256 A1 * | 6/2017 | H04L 9/003 |

* cited by examiner

Apply a block cipher algorithm to an input data to generate a cryptographic output, wherein applying the block cipher to the input data comprises modifying an output of a stage of the block cipher algorithm such that each output of the stage of the block cipher algorithm has a constant Hamming weight — 305

Outputting the cryptographic output — 310

FIG. 3

Modify the output of the substitution round to have a constant Hamming weight — 405

LIGHTWEIGHT MITIGATION AGAINST FIRST-ORDER PROBING SIDE-CHANNEL ATTACKS ON BLOCK CIPHERS

BACKGROUND

Block cipher algorithms are widely used methods of securing data on computing devices. However, such block cipher algorithms can be vulnerable to probing side-channel attacks which exploit information leaked during the encryption process to determine the secret keys used by the encryption algorithm.

SUMMARY

Implementations of an example method for securing data according to the disclosure includes applying a block cipher algorithm to an input data to generate a cryptographic output, wherein applying the block cipher to input data comprises modifying an output of a stage of the block cipher algorithm such that each output of the stage of the block cipher algorithm has a constant Hamming weight, and outputting the cryptographic output.

Implementations of such a method can include one or more of the following features. The stage of the block cipher algorithm is a diffusion stage of the block cipher algorithm. The diffusion stage comprises a substitution round, and modifying the output of the diffusion stage comprises modifying the output of the substitution round to have the constant Hamming weight. Modifying the output of the stage of the block cipher algorithm such that each output of the stage of the block cipher algorithm has a constant Hamming weigh includes determining a Hamming weight of an output of the stage of the block cipher algorithm and determining a weight difference between the Hamming weight of the output and a constant output weight value. Determining a weight adjustment value having a Hamming weight equal to the weight difference, and combining the output of the weight adjustment value with the output of the stage of the block cipher algorithm. Combining the output of the weight adjustment value with the output of the stage of the block cipher algorithm includes concatenating the output of the weight adjustment value with the output of the stage of the block cipher algorithm.

An example apparatus according to the disclosure includes means for applying a block cipher algorithm to an input data to generate a cryptographic output, such that applying the block cipher to input data comprises modifying an output of a stage of the block cipher algorithm such that each output of the stage of the block cipher algorithm has a constant Hamming weight; and means for outputting the cryptographic output.

Implementations of such an apparatus can include one or more of the following features. The stage of the block cipher algorithm is a diffusion stage of the block cipher algorithm. The diffusion stage comprises a substitution round, and the means for modifying the output of the diffusion stage comprises means for modifying the output of the substitution round to have the constant Hamming weight. The means for modifying the output of the stage of the block cipher algorithm such that each output of the stage of the block cipher algorithm has a constant Hamming weigh includes: means for determining a Hamming weight of an output of the stage of the block cipher algorithm, and means for determining a weight difference between the Hamming weight of the output and a constant output weight value. Means for determining a weight adjustment value having Hamming weight equal to the weight difference, and means for combining the output of the weight adjustment value with the output of the stage of the block cipher algorithm. The means for combining the output of the weight adjustment value with the output of the stage of the block cipher algorithm also includes means for concatenating the output of the weight adjustment value with the output of the stage of the block cipher algorithm.

An example apparatus according to the disclosure includes a memory and a processor communicatively coupled to the memory. The processor is configured to apply a block cipher algorithm to an input data to generate a cryptographic output, wherein applying the block cipher to input data comprises modifying an output of a stage of the block cipher algorithm such that each output of the stage of the block cipher algorithm has a constant Hamming weight, and output the cryptographic output.

Implementations of such an apparatus can include one or more of the following features. The stage of the block cipher algorithm is a diffusion stage of the block cipher algorithm. The diffusion stage comprises a substitution round, and the processor is further configured to modify the output of the substitution round to have the constant Hamming weight. The processor being configured to modify the output of the stage of the block cipher algorithm such that each output of the stage of the block cipher algorithm has a constant Hamming weigh is further configured to determine a Hamming weight of an output of the stage of the block cipher algorithm, and determine a weight difference between the Hamming weight of the output and a constant output weight value. The processor is further configured to determine a weight adjustment value having Hamming weight equal to the weight difference, and combine the output of the weight adjustment value with the output of the stage of the block cipher algorithm. The processor being configured to combine the output of the weight adjustment value with the output of the stage of the block cipher algorithm is further configured to concatenate the output of the weight adjustment value with the output of the stage of the block cipher algorithm.

An example non-transitory, computer-readable medium, having stored thereon computer-readable instructions for securing data, according to the disclosure includes instructions configured to cause a computing device to apply a block cipher algorithm to an input data to generate a cryptographic output, wherein applying the block cipher to input data comprises modifying an output of a stage of the block cipher algorithm such that each output of the stage of the block cipher algorithm has a constant Hamming weight, and output the cryptographic output.

Implementations of such a non-transitory, computer-readable medium can include one or more of the following features. The stage of the block cipher algorithm is a diffusion stage of the block cipher algorithm. The diffusion stage comprises a substitution round, and the instructions configured to cause the computing device to modify the output of the diffusion stage further comprise instructions configured to cause the computing device to modify the output of the substitution round to have the constant Hamming weight. The instructions configured to cause the computing device to modify the output of the stage of the block cipher algorithm such that each output of the stage of the block cipher algorithm has a constant Hamming weigh include instructions configured to cause the computing device to determine a Hamming weight of an output of the stage of the block cipher algorithm, and determine a weight difference between the Hamming weight of the output and a constant output weight value. Instructions configured to cause the computing device to determine a weight adjustment value having a Hamming weight equal to the weight difference, and combine the output of the weight adjustment value with the output of the stage of the block cipher algorithm. The instructions configured to cause the computing device to combining the output of the weight adjustment value with the output of the stage of the block cipher algorithm include instructions configured to cause the computing device to concatenate the output of the weight adjustment value with the output of the stage of the block cipher algorithm.

DETAILED DESCRIPTION

Techniques are disclosed herein for securing data. These techniques can provide lightweight mitigation against probing side-channel attacks on block cipher algorithms. A block cipher algorithm can be subjected to a probing side-channel attack to try to obtain information that can be used to deduce the secret keys used by the block cipher algorithm. An attacker can observe processing performed by a device using the block cipher algorithm and monitor the intensity of electromagnetic (EM) radiation emitted by the device while the device is performing processing associated with the block cipher algorithm. The attacker can capture numerous EM traces of the device executing the block cipher algorithm and perform signal processing and analysis to these traces to attempt to determine, at least in part, the secret key used by the block cipher algorithm. A block cipher algorithm can be vulnerable to a probe side-channel attack at points in the algorithm where an intermediate value is written to a data register. The attacker can capture EM traces of the algorithm operating on an input and review the EM traces to obtain information about the intermediate values written to the data register. The intensity of an EM trace is proportional to the Hamming weight of the output byte or bytes that are written to the output register. The attacker can analyze this information to determine the secret key used by the block cipher algorithm. The techniques disclosed herein can prevent such an attack by setting the Hamming weight of any intermediate values written to an output register to a constant value.

The techniques disclosed herein provide advantages over conventional approaches to mitigating such side-channel attacks. For example, empirical mitigations to such side-channel attacks can increase the noise level in the traces. Such an approach can be easy to implement, but can also be easy to circumvent with through the use of refined signal processing techniques. Algorithmic approaches, such as masking, randomly changing bus polarity, dual rail logic, and field extension mapping, are more secure, but are complex to implement and add high-overhead and latency to the cryptographic processing. The techniques disclosed herein provide an easy to implement solution that is difficult to circumvent. The size of the output register is increased but the stage or round of the block cipher algorithm does not need to be altered. Instead, the Hamming weight of the output from the stage or round of the block cipher algorithm is determined before the value is written to the output register and a weight adjustment value is determined so that the Hamming weight of the output will be a predetermined constant value for all outputs written to an output register. The size of the output register is increased to accommodate the additional bits of data that are used to store the weight adjustment value. The weight adjustment value can be combined with the output value from the stage or round of the block cipher algorithm before the output value is written to the output register such that the Hamming weight of the value written to the register remains constant. The weight adjustment value can be concatenated to the output value from the stage or round of the block cipher or may be interleaved with the bits of the output value such that the Hamming weight remains constant.

Figure 1:
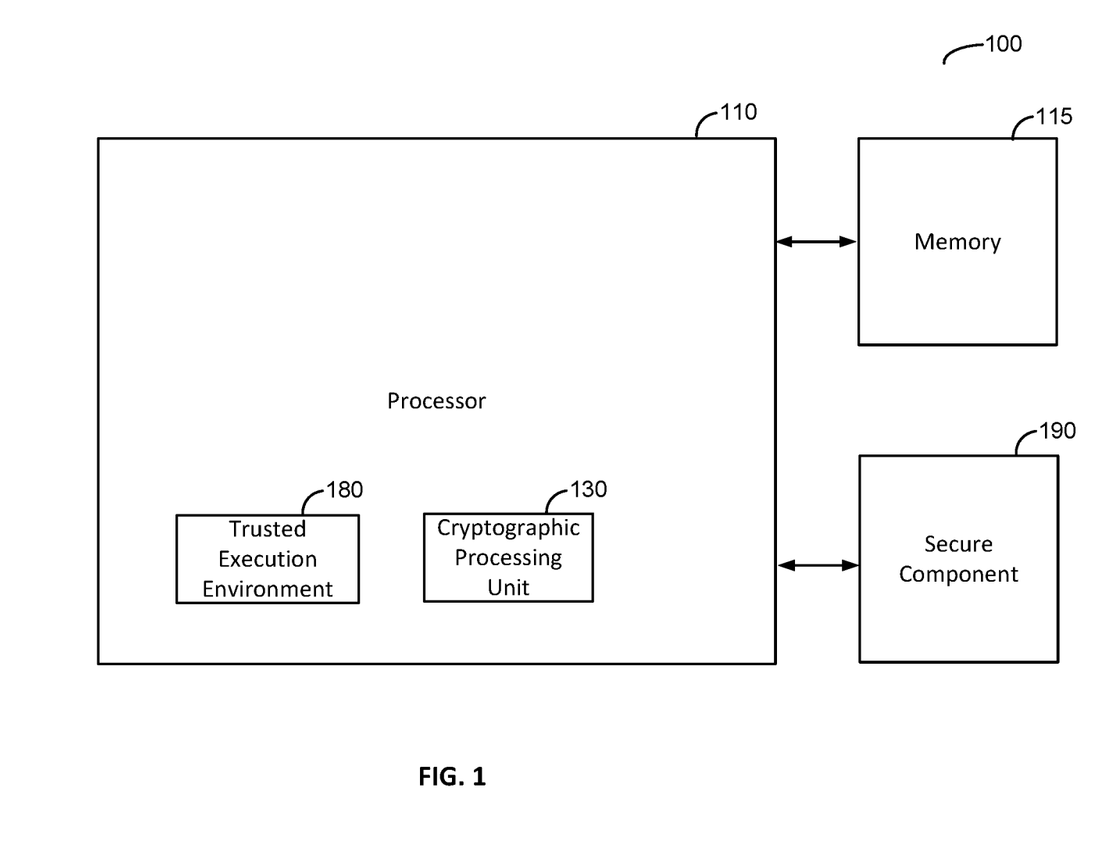
FIG. 1 is a functional block diagram of an example computing device illustrating the techniques disclosed herein.

FIG. 1 is a functional block diagram of an example computing device 100 that can be used to perform the techniques for authenticating data disclosed herein. The computing device 100 includes a processor 110. The processor 110 can be communicatively coupled to a computer-readable memory, such as the memory 115, that can be used to store data used by the processor 110. The memory 115 can comprise volatile memory, non-volatile memory, or a combination thereof. The processor 110 can be configured to perform the various processes discussed herein for authenticating data disclosed herein. The processor 110 can be configured to perform the various processes discussed herein for authenticating data disclosed herein. The computing device 100 can comprise a chip component (e.g., an integrated circuit, system on a chip (SOC)) or a downstream product incorporating such a chip component such as a mobile communication device, a User Equipment (UE), a mobile station, a terminal, an access terminal, a subscriber unit, a station, etc. The computing device 100 can also be a smartphone, a tablet computer, a laptop computer, game console, wearable device (such as a smart watch), vehicle-mounted computing device, or other type of computing device. The computing device 100 can be a desktop computer, computer server, or other type of computing device that may be moved but is substantially stationary. The computing device 100 can be configured to include wired and/or wireless network connectivity that enables the computing device 100 communicate with other networked computing devices.

The processor 110 can include a trusted execution environment 180 and/or the computing device 100 can include a secure component 190. The trusted execution environment 180 and the secure component 190 are optional components and one or both of these components may not be included in an implementation of the computing device 100. The trusted execution environment 180 and/or the secure component 190 can be used to implement a secure processing environment for storing sensitive data and for performing processes that need to remain secure, such as performing cryptographic operations on data, storing the cryptographic keys used to perform these operations, storing other sensitive data, or a combination thereof. The trusted execution environment 180 can be implemented as a secure area of the processor 110 that can be used to process and store sensitive data. The trusted execution environment 180 can be configured to execute trusted applications that provide end-to-end security for sensitive data by enforcing confidentiality, integrity, and protection of the sensitive data stored therein. The trusted execution environment 180 can be used to store encryption keys, secure application program code, and/or other sensitive information.

The computing device 100 can include a secure component 190 (also referred to herein as a trusted component) that can be associated with the processor 110. The computing device can include the secure component 190 in addition to or instead of the trusted execution environment 180. The secure component 190 can comprise autonomous and tamper-resistant hardware that can be used to execute secure applications and/or processes. The secure component 190 can be used to implement the processes for mitigating attacks on the baseband process disclosed herein and may implement these processes in combination with the trusted execution environment 180. The secure component 190 can be configured to store sensitive data and to provide confidentiality, integrity, and protection to the data stored therein. The secure component 190 can be used to store encryption keys, user data, and/or other sensitive data. The secure component 190 can be integrated with the hardware of the computing device in a permanent or semi-permanent fashion can be used to securely store data and/or provide a secure execution environment for applications.

The computing device 100 can also include a cryptographic processing unit 130 that is configured to perform the various cryptographic operations and can be used to implement the various techniques disclosed herein. The cryptographic processing unit 130 can be implemented as a trusted application comprising program code executable by the trusted execution environment 180 and/or the secure component 190 and stored in a secure memory location associated with one or both of trusted execution environment 180 and/or the secure component 190 to prevent an attacker from tampering with or disabling the cryptographic processing unit 130. The cryptographic processing unit 130 can also be implemented by a software, hardware, or combination thereof that is implemented outside of a trusted execution environment 180 and/or the secure component 190 (and not every implementation of the computing device 100 necessarily include the trusted execution environment 180 and/or the secure component 190). The cryptographic processing unit 130 can also be implemented in hardware and may be implemented as part of the processor 110 (as shown in FIG. 1) or may be implemented in separate hardware than the processor 110 but may be implemented on the same integrated circuit as the processor 110. The cryptographic processing unit 130 can be implemented as one or more application specific integrated circuits (ASICs), programmable logic devices (PLDs), field programmable gate arrays (FPGAs), or other electronic units designed to perform the functions described herein, or a combination thereof. The cryptographic processing unit 130 can also be implemented as a combination of hardware and software components. The cryptographic processing unit 130 can implement cryptographic algorithms in hardware. For example, the example stage of a block cipher algorithm illustrated in FIG. 8 (which will be discussed in detail below) can be implemented as part of the hardware of the cryptographic processing unit 130, or may alternatively be implemented as a combination of hardware and/or software components, or as software components of the cryptographic processing unit 130.

Figure 2:
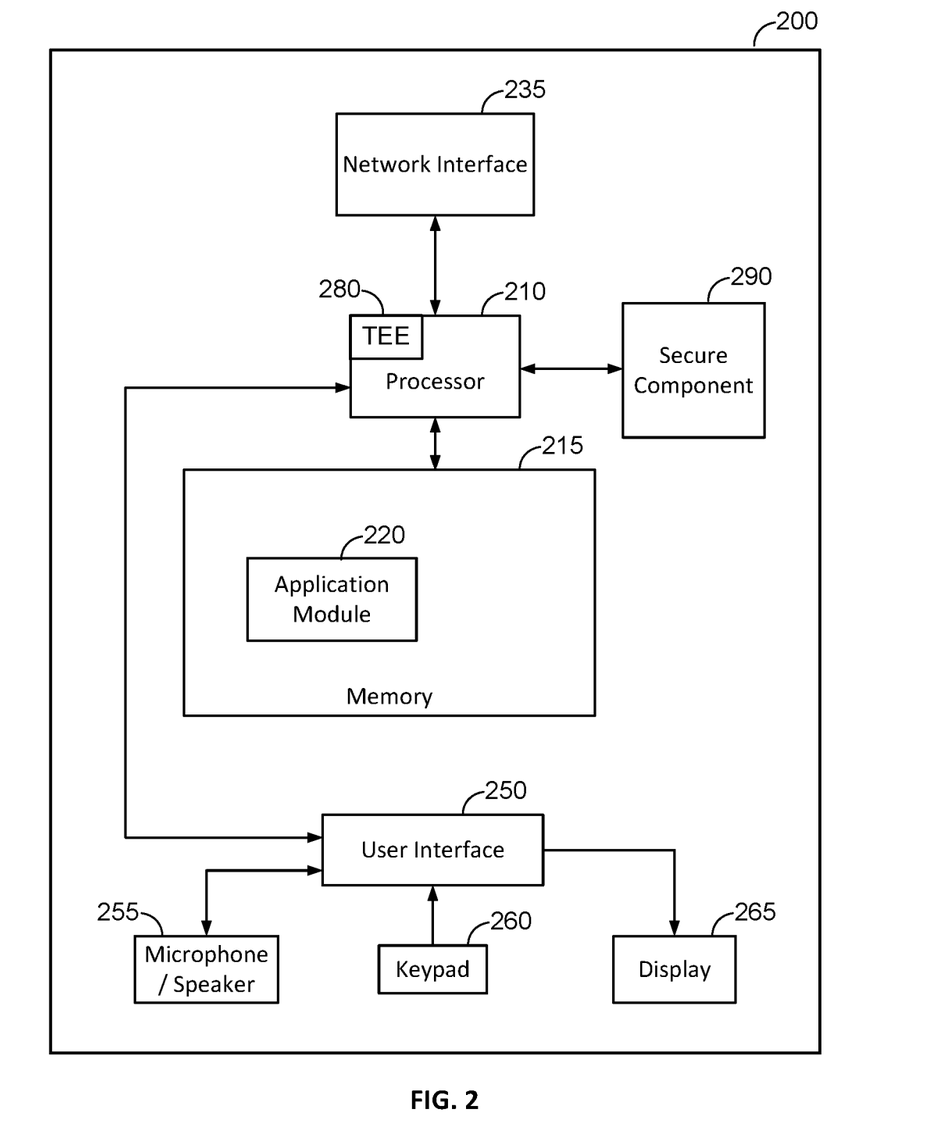
FIG. 2 is a functional block diagram of an example computing device that can be used to implement the computing device illustrated in FIG. 1.

FIG. 2 is a functional block diagram of an example computing device 200 that can be used to implement the computing device 100 illustrated in FIG. 1. FIG. 2 is a schematic diagram illustrating various components of an example computing device 200, which can be similar to or the same as the computing device 100 FIG. 1. For the sake of simplicity, the various features/components/functions illustrated in the schematic boxes of FIG. 2 are connected together using a common bus to represent that these various features/components/functions are operatively coupled together. Other connections, mechanisms, features, functions, or the like, can be provided and adapted as necessary to operatively couple and configure a portable wireless device. Furthermore, one or more of the features or functions illustrated in the example of FIG. 2 can be further subdivided, or two or more of the features or functions illustrated in FIG. 2 can be combined. Additionally, one or more of the features or functions illustrated in FIG. 2 can be excluded.

As shown, the computing device 200 can include a network interface 235 that can be configured to provide wired and/or wireless network connectivity to the computing device 200. The wireless network connectivity of the network interface 235 can enable the computing device 100 to connect to wireless local area networks and/or a wireless wide-area networks. Other types of wireless connectivity, such as personal but not limited to area networks and Bluetooth® wireless connectivity, can also be supported.

The processor 210 can include one or more microprocessors, microcontrollers, and/or digital signal processors that provide processing functions, as well as other calculation and control functionality. The processor 210 can be coupled to storage media (e.g., memory) 215 for storing data and software instructions for executing programmed functionality within the mobile device. The memory 215 can be on-board the processor 210 (e.g., within the same IC package), and/or the memory can be external memory to the processor and functionally coupled over a data bus.

A number of software modules and data tables can reside in memory 215 and can be utilized by the processor 210 in order to manage both communications with remote devices, perform device control functionality, and/or perform other computing tasks. As illustrated in FIG. 2, in some embodiments, the memory 215 can include an application module 220 which can implement one or more applications. It is to be noted that the functionality of the modules and/or data structures can be combined, separated, and/or be structured in different ways depending upon the implementation of the computing device 200.

The application module 220 can be a process running on the processor 210 of the computing device 200, which can request information from and/or computations be performed by the cryptographic processing unit 130 and/or information or other data from other modules of the computing device 200. Applications typically run within an upper layer of the software architectures and can be implemented in a rich execution environment of the computing device 200.

The processor 210 can include a trusted execution environment 280 and/or the computing device 200 may include a secure component 290. The trusted execution environment 280 and the secure component 290 are optional components and one or both of these components may not be included in an implementation of the computing device 200. The trusted execution environment 280 can be used to implement the trusted execution environment 180 of the processor 110 illustrated in FIG. 1. The trusted execution environment 280 and/or the secure component 290 can be used to implement a secure processing environment for storing sensitive data and for performing processes that need to remain secure, such as the processes disclosed herein for authenticating data.

The trusted execution environment 280 can be implemented as a secure area of the processor 210 that can be used to process and store sensitive data. The trusted execution environment 280 can be configured to execute trusted applications that provide end-to-end security for sensitive data by enforcing confidentiality, integrity, and protection of the sensitive data stored therein. The trusted execution environment 280 can be used to store encryption keys, secure application program code, and/or other sensitive information. The trusted execution environment 280 can be used to implement software and/or hardware components of the cryptographic processing unit 130 illustrated in FIG. 1.

The computing device 200 can include a secure component 290. The mobile wireless device can include the secure component 290 in addition to or instead of the trusted execution environment 280. The secure component 290 can comprise autonomous and tamper-resistant hardware that can be used to execute secure applications and/or processes. The secure component 290 can be used to implement the processes for authenticating data disclosed herein and may implement these processes in combination with the trusted execution environment 280. The secure component 290 can be configured to store sensitive data and to provide confidentiality, integrity, and protection to the data stored therein. The secure component 290 can be used to store encryption keys, user data, and/or other sensitive data. The secure component 290 can be integrated with the hardware of the mobile wireless device in a permanent or semi-permanent fashion can be used to securely store data and/or provide a secure execution environment for applications. The secure component 290 can be used to implement software and/or hardware components of the cryptographic processing unit 130 illustrated in FIG. 1.

The computing device 200 can further include a user interface 250 providing suitable interface systems, such as a microphone/speaker 255, a keypad 260, and a display 265 that allows user interaction with the computing device 200. The microphone/speaker 255 (which can be the same or different from the audio sensor) provides for voice communication services (e.g., using the wide area network transceiver(s) 230 and/or the local area network transceiver(s) 235). The keypad 260 can comprise suitable buttons for user input. The display 265 can include a suitable display, such as, for example, a backlit LCD display, and can further include a touch screen display for additional user input modes.

Figure 3:
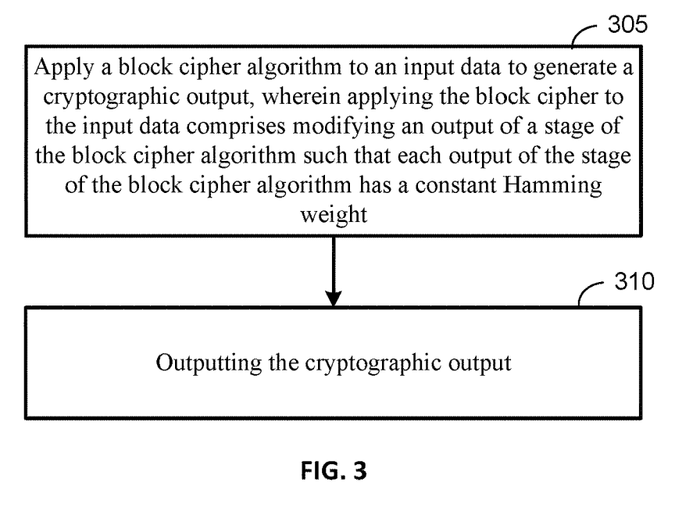
FIG. 3 is a flow diagram of an example process for securing data on a computing device according to the techniques disclosed herein.

FIG. 3 is a flow diagram of an example process for securing data on a computing device according to the techniques disclosed herein. The process illustrated in FIG. 3 can be used to mitigate probing side-channel attacks on block ciphers. The process illustrated in FIG. 3 can mitigate such attacks on block ciphers by keeping the Hamming weight of intermediate outputs of the block cipher algorithm constant. Keeping the Hamming weight of the intermediate outputs of the block cipher algorithm constant can prevent an attacker from deducing information about the secret key used by the block cipher algorithm. The process illustrated in FIG. 3 can be performed by the cryptographic processing unit 130 of the processor 110. The process illustrated in FIG. 3 can also be performed by the trusted execution environment 180 and/or the secure component 190 of the computing device 100.

The process illustrated in FIG. 3 can begin with applying a block cipher algorithm to an input data to generate a cryptographic output (stage 305). Applying the block cipher algorithm to the input data includes modifying an output of a stage of the block cipher algorithm such that each intermediate output of the block cipher algorithm has a constant Hamming weight. Various stages of the block cipher algorithm may write intermediate outputs, which are data resulting from cryptographic processing, to an output register. This intermediate data may then be used by a subsequent stage or round of processing of the block cipher algorithm. Prior to the output being written to the output register, a weight adjustment value can be determined for the output and the weight adjustment value can be combined with the output such that the output has a constant Hamming weight. The weight adjustment value can comprise one or more bits of data that can be combined with the output such that the combined value has a Hamming weight equal to a predetermined constant value. The size of the output register is adjusted to be large enough to accommodate the output plus the weight adjustment value. For example, the output may comprise one byte or one nibble of data in some implementations and the weight adjustment value may also comprise one byte or one nibble of data. The output register is sized to accommodate the combination of the output and the weight adjustment value. The number of bits comprising the weight adjustment value can vary depending on the implementation, and the size of the output register is adjusted accordingly. In some implementations, the weight adjustment value may be concatenated to the output value from the stage or round of the block cipher while in other implementations, the bits of the weight adjustment value may be interleaved with the bits of the output value such that the Hamming weight of the combination of the output and the weight adjustment value is a constant Hamming weight value for all outputs of the stage regardless of the input.

The modified output of the stage or block of the block cipher algorithm can be calculated using the following formula: output of the stage (Input)||n, such that H(Output) =C, wherein stage( ) represents a stage of a block cipher algorithm, wherein Input represents an input value to the stage, wherein n represents the weight adjustment value, where the Hamming weight of the weight adjustment value and the Hamming weight of the output of the stage(Input) equal a constant value C. The output of the stage (Input) can be concatenated to or otherwise combined with the weight adjustment value n such that that Hamming weight of the concatenated or combined values is the constant value C.

The constant value C can be dependent at least in part on the number of bits comprising the output of the stage(Input), the number of bits comprising the output register to which the output having the modified Hamming weight is to be written, or can be an arbitrary value that is predetermined. The constant value C may also be randomly selected from a range of possible constant value limited at least in part by the number of bits comprising the output of the stage (Input) and the number of bits comprising the output register to which the output having the modified Hamming weight is to be written. An example of a stage of a block cipher algorithm in which the output has been modified to have a constant Hamming weight that illustrates these concepts is discussed below with respect to FIG. 8.

The process can continue with outputting a cryptographic output (stage 310). The block cipher algorithm can be configured to output a cryptographic result determined from the cryptographic processing of the input by the block cipher algorithm. The cryptographic output may be used as an input to further cryptographic processing to be performed by the cryptographic processing unit 130 of the computing device 100. The cryptographic output may also be stored in memory 115 of the computing device 100 for later processing. The original input of the may later be recovered by decrypting the cryptographic output.

Figure 8:
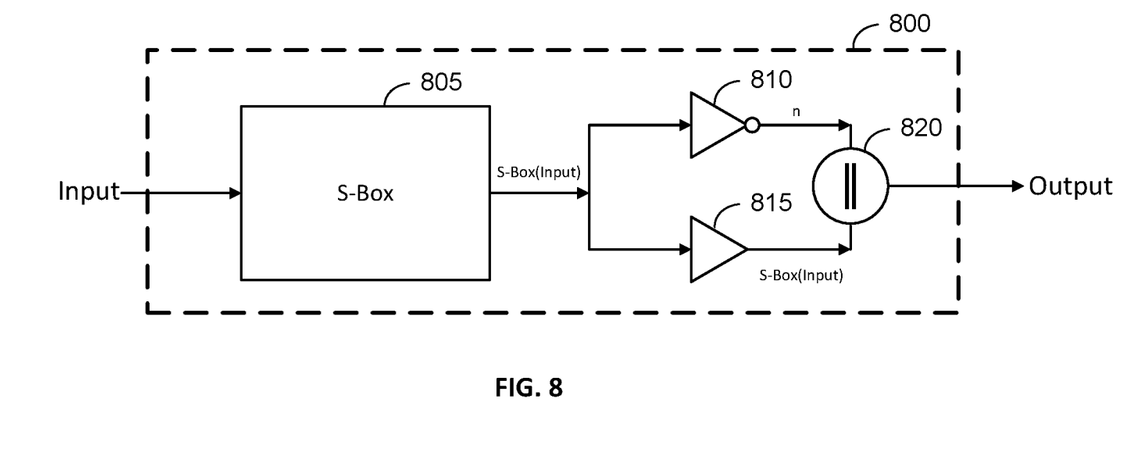
FIG. 8 illustrates a functional block diagram of an implementation of an example stage of an example block cipher algorithm in which the stage has been modified to implement adjusting the output of the stage of the block cipher algorithm to have a constant Hamming weight according to the techniques disclosed herein.

FIG. 8 illustrates a functional block diagram of an implementation of an example stage 800 of an example block cipher algorithm in which the stage has been modified to implement adjusting the output of the stage of the block cipher algorithm to have a constant Hamming weight according to the techniques disclosed herein. The example stage 800 illustrated in FIG. 8 is a S-Box 805 or Substitution Box of an example block cipher algorithm. However, the techniques illustrated herein are not limited to the S-Box or other diffusion stage of a block cipher algorithm. The techniques disclosed herein can be applied to any stage of the block cipher algorithm in which an intermediate value is written to an output register. An intermediate value is a value that is written to the output register and serves as an input to a subsequent round or stage of the block cipher algorithm. The logical functions of the components of the example illustrated in FIG. 8 can be implemented in software, hardware, or a combination thereof.

The output of the S-Box 805 is input to a inverter block 810, which inverts the bits of the output from the S-Box 805 to determine the value n, which represents the weight adjustment value to be combined with the output of the buffer 815 by the concatenation block 820. The buffer 815 receives the output of the S-Box 805 and outputs the same value that was input. The buffer 815 can be used to isolate the input and the output and/or for impedance matching. The logical function of the buffer 815 can be omitted in software implementations of the S-Box 805. The output of the concatenation block 820 can be written to an output register of the processor 110 of the computing device 100. In the example illustrated in FIG. 8, the size of the output of the concatenation block 820 is double the size of the output of the S-Box 805, so the output register of the processor 110 must be large enough to accommodate this larger-sized output. However, the implementation of the stage of the block cipher algorithm, the S-Box 805 in this example, does not need to be modified in order to generate an output having a constant Hamming weight. In the example illustrated in FIG. 8, the Hamming weight output by the concatenation block 820 will always equal the number of bits in the output of the S-Box 805. In other implementations, the Hamming weight may be a constant value that is not dependent on the number of bits in the output from the stage of the block cipher algorithm.

Figure 4:
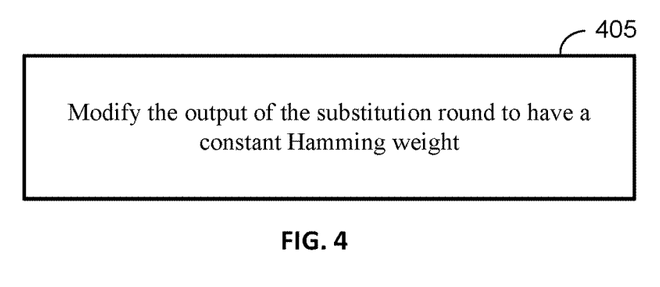
FIG. 4 is a flow diagram of an example process for securing data on a computing device according to the techniques disclosed herein.

FIG. 4 is a flow diagram of an example process for securing data on a computing device according to the techniques disclosed herein. The process illustrated in FIG. 4 can be used to implement, at least in part, stage 305 of the process illustrated in FIG. 3. The process illustrated in FIG. 4 can be performed by the cryptographic processing unit 130 of the processor 110. The process illustrated in FIG. 4 can also be performed by the trusted execution environment 180 and/or the secure component 190 of the computing device 100.

The output of a substitution round of the cryptographic algorithm can be modified to have a constant Hamming weight (stage 405). The stage or round of the block cipher algorithm can be a substation stage or round or other such diffusion stage of a block cipher algorithm. A diffusion stage can include substitution and/or permutation of bytes of state data. FIG. 8 as discussed above, illustrates an example of setting the Hamming weight of such a stage of a cryptographic algorithm to have a constant Hamming weight.

Figure 5:
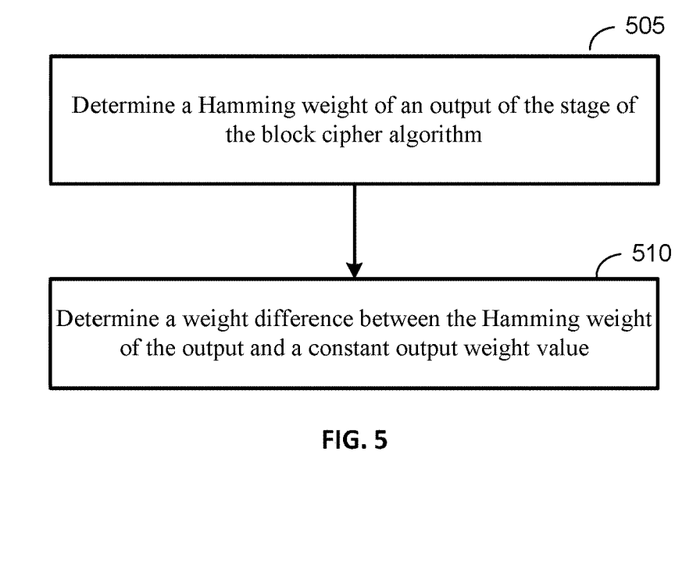
FIG. 5 is a flow diagram of an example process for securing data on a computing device according to the techniques disclosed herein

FIG. 5 is a flow diagram of an example process for securing data on a computing device according to the techniques disclosed herein. The process illustrated in FIG. 5 can be implemented by the cryptographic processing unit 130 of the processor 110 of the computing device 100. The process illustrated in FIG. 5 can be used to implement, at least in part, stage 305 of the process illustrated in FIG. 3. The process illustrated in FIG. 5 can be performed by the cryptographic processing unit 130 of the processor 110. The process illustrated in FIG. 5 can also be performed by the trusted execution environment 180 and/or the secure component 190 of the computing device 100.

A Hamming weight of an output of the stage of the block cipher algorithm can be determined (stage 505). The Hamming weight of the output of the block cipher algorithm can be determined by adding up the number of bits comprising the output of the block cipher algorithm that have a value of 1 (one) rather than 0 (zero).

A weight difference between the Hamming weight of the output and a constant output weight value can be determined (stage 510). The Hamming weight determined in stage 505 can be subtracted from a predetermined constant value (referred to in the examples above as 'C'). The predetermined constant value is a constant Hamming weight value to be associated with all intermediate outputs of the block cipher algorithm that are written to the output register of the processor 110. The difference between the Hamming weight of the output and the constant value can be used to determine a weight adjustment value that can be combined with the output to alter the Hamming weight of the output to be constant.

Figure 6:
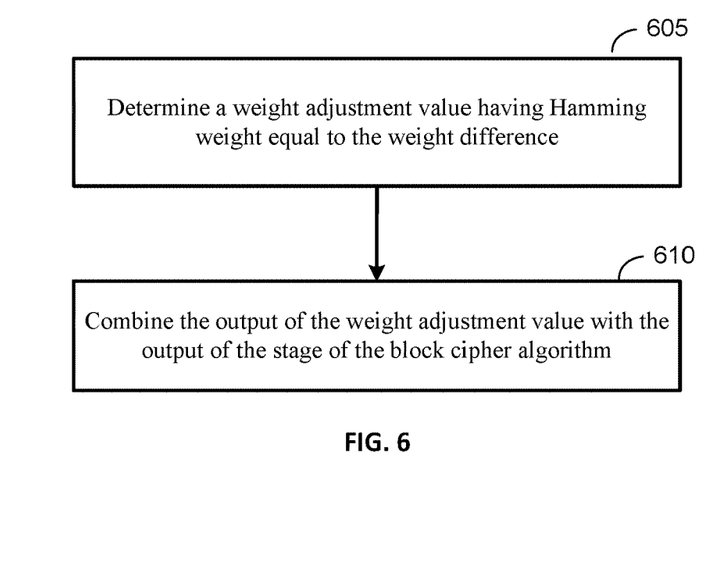
FIG. 6 is a flow diagram of an example process for securing data on a computing device according to the techniques disclosed herein

FIG. 6 is a flow diagram of an example process for securing data on a computing device according to the techniques disclosed herein. The process illustrated in FIG. 6 can be implemented by the cryptographic processing unit 130 of the processor 110 of the computing device 100. The process illustrated in FIG. 6 can be used to implement, at least in part, stage 305 of the process illustrated in FIG. 3 and can be used to implement additional stages to the process illustrated in FIG. 5. The process illustrated in FIG. 6 can be performed by the cryptographic processing unit 130 of the processor 110. The process illustrated in FIG. 6 can also be performed by the trusted execution environment 180 and/or the secure component 190 of the computing device 100.

A weight adjustment value having a Hamming weight equal to the weight difference can be determined (stage 605). The weight adjustment value can comprise a number of bits that are set to a value of 1 (one) such that the Hamming weight of the weight adjustment value is equal to the Hamming weight difference between the output of the stage of the block cipher algorithm and the constant Hamming weight value to be associated with all outputs. Bits to be set to '1' can be selected using various processes. The bits can be selected randomly or pseudo-randomly from a set of bits that can comprise the weight adjustment value. Alternatively, the bits may be selected sequentially. To illustrate this concept, if the weight adjustment value is determined to require a Hamming weight of '4' (four) and the size of the weight adjustment value is to be one byte, then four bits of the byte can set to value of '1' (one) while the remaining bits of the byte are set to a value of '0' (zero). The example of FIG. 8 discussed above, illustrates another technique in which the weight adjustment value can be calculated by inverting the bits of the output of the stage of the block cipher algorithm.

The weight adjustment value can be combined with the output of the stage of the block cipher algorithm (stage 610). As discussed above, the weight adjustment value can be concatenated with the output of the stage of the block cipher algorithm or can be interleaved with the bits of the output of the stage of the block cipher algorithm. The combined output can be written to an output register of the processor 110 of the computing device 100. The processor can retrieve the value from the output register and strip off the bits associated with the weight adjustment value in order to recover the value associated with the output of the stage of the block cipher algorithm. The recovered value may be used for continued processing by a next stage or round of the block cipher algorithm.

Figure 7:
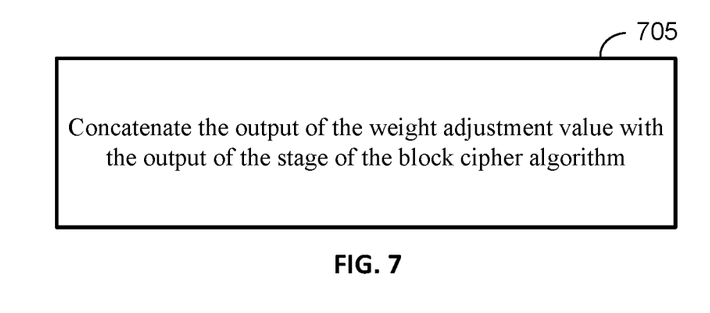
FIG. 7 is a flow diagram of an example process for securing data on a computing device according to the techniques disclosed herein

FIG. 7 is a flow diagram of an example process for securing data on a computing device according to the techniques disclosed herein. The process illustrated in FIG. 6 can be used to implement, at least in part, stage 305 of the process illustrated in FIG. 3 and can be used to implement, at least in part, stage 610 to the process illustrated in FIG. 6. The process illustrated in FIG. 7 can be performed by the cryptographic processing unit 130 of the processor 110. The process illustrated in FIG. 7 can also be performed by the trusted execution environment 180 and/or the secure component 190 of the computing device 100.

The output of the weight adjustment value can be concatenated with the output of the stage of the block cipher algorithm (stage 705). As discussed above with respect to the example stage of a cryptographic algorithm illustrated in FIG. 8 and discussed above with respect to FIG. 3, the output from a stage or round of a cryptographic algorithm can be concatenated with a weight adjustment value so that the Hamming weight of the concatenated value is a constant value for all outputs that are written to an output register of the processor 110 of the computing device 100. As also discussed above, in other implementations, the bits of the weight adjustment value may be interleaved with the bits of the output of the stage of the block cipher algorithm in a predetermined pattern rather than concatenating the weight adjustment value either before or after the bits of the output of the stage of the block cipher algorithm. The predetermined pattern can be stored in a protected memory location by the processor 110 and the processor can use this pattern to discard the bits of the weight adjustment value upon retrieving the value stored in the output register and to recover the output of the stage of the block cipher algorithm from the combined value that was written to the output register.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for securing data, the method comprising:
applying a block cipher algorithm to an input data to generate a cryptographic output using a hardware processor of a computing device, wherein the block cipher algorithm comprises at least one stage that generates an intermediate output used to generate the cryptographic output, and wherein applying the block cipher to input data comprises modifying the intermediate output of the at least one stage of the block cipher algorithm such that the intermediate output of the at least one stage of the block cipher algorithm has a Hamming weight selected based on a number of bits of the intermediate output of the stage of the block cipher algorithm, wherein modifying the intermediate output of the at least one stage of the block cipher algorithm further comprises determining the Hamming weight of the intermediate output of the at least one stage of the block cipher algorithm, and determining a weight difference between the Hamming weight of the intermediate output of the at least one stage of the block cipher algorithm and an output weight value; and outputting, using the hardware processor, the cryptographic output.

2. The method of claim 1, wherein the at least one stage of the block cipher algorithm comprises a diffusion stage of the block cipher algorithm.

3. The method of claim 2, wherein the diffusion stage comprises a substitution round, and wherein modifying the intermediate output of the diffusion stage comprises modifying the intermediate output of the substitution round to have the Hamming weight selected based on the number of bits of the intermediate output of the stage of the block cipher algorithm.

4. The method of claim 1, further comprising:
determining a weight adjustment value having a Hamming weight equal to the weight difference; and
combining the weight adjustment value with the intermediate output of the at least one stage of the block cipher algorithm.

5. The method of claim 4, wherein combining the weight adjustment value with the intermediate output of the at least one stage of the block cipher algorithm further comprises:
concatenating the weight adjustment value with the intermediate output of the at least one stage of the block cipher algorithm.

6. The method of claim 1, wherein modifying the output of a stage of the block cipher algorithm such that each output of the stage of the block cipher algorithm has the Hamming weight selected based on the number of bits of the output of the stage of the block cipher algorithm further comprises:
interleaving bits of the output of the stage of the block cipher algorithm with a weight adjustment value.

7. The method of claim 1, wherein the Hamming weight is selected based on the number of bits of the intermediate output of the stage of the block cipher algorithm and a number of bits comprising a register in which the intermediate output is to be stored.

8. An apparatus comprising:
means for applying a block cipher algorithm to an input data to generate a cryptographic output, wherein the block cipher algorithm comprises at least one stage that generates an intermediate output used to generate the cryptographic output, and wherein the means for applying the block cipher to input data comprises means for modifying the intermediate output of the at least one stage of the block cipher algorithm such that the intermediate output of the stage of the block cipher algorithm has a Hamming weight selected based on a number of bits of the intermediate output of the at least one stage of the block cipher algorithm, wherein modifying the intermediate output of the at least one stage of the block cipher algorithm further comprises means for determining the Hamming weight of the intermediate output of the at least one stage of the block cipher algorithm, and means for determining a weight difference between the Hamming weight of the intermediate output of the at least one stage of the block cipher algorithm and an output weight value; and
means for outputting the cryptographic output.

9. The apparatus of claim 8, wherein the at least one stage of the block cipher algorithm comprises a diffusion stage of the block cipher algorithm.

10. The apparatus of claim 9, wherein the diffusion stage comprises a substitution round, and wherein the means for modifying the output of the diffusion stage comprises means for modifying the intermediate output of the substitution round to have the Hamming weight selected based on the number of bits of the intermediate output of the stage of the block cipher algorithm.

11. The apparatus of claim 8, further comprising:
means for determining a weight adjustment value having a Hamming weight equal to the weight difference; and
means for combining the weight adjustment value with the intermediate output of the stage of the block cipher algorithm.

12. The apparatus of claim 11, wherein the means for the weight adjustment value with the intermediate output of the stage of the block cipher algorithm further comprises:
means for concatenating the output of the weight adjustment value with the intermediate output of the stage of the block cipher algorithm.

13. An apparatus comprising:
a memory; and
a processor communicatively coupled to the memory, the processor configured to:
apply a block cipher algorithm to an input data to generate a cryptographic output, wherein the block cipher algorithm comprises at least one stage that generates an intermediate output used to generate the cryptographic output, and wherein the processor being configured to apply the block cipher to input data is further configured to modify the intermediate output of a stage of the block cipher algorithm such that the intermediate output of the at least one stage of the block cipher algorithm has a Hamming weight selected based on a number of bits of the intermediate output of the at least one stage of the block cipher algorithm, wherein the processor being further configured to modify the intermediate output of the at least one stage of the block cipher algorithm further comprises determining the Hamming weight of the intermediate output of the at least one stage of the block cipher algorithm, and to determine a weight difference between the Hamming weight of the intermediate output of the at least one stage of the block cipher algorithm and an output weight value; and
output the cryptographic output.

14. The apparatus of claim 13, wherein the at least one stage of the block cipher algorithm comprises a diffusion stage of the block cipher algorithm.

15. The apparatus of claim 14, wherein the diffusion stage comprises a substitution round, and wherein the processor is further configured to modify the intermediate output of the substitution round to have the Hamming weight selected based on the number of bits of the intermediate output of the stage of the block cipher algorithm.

16. The apparatus of claim 13, wherein the processor is further configured to:
determine a weight adjustment value having a Hamming weight equal to the weight difference; and
combine the weight adjustment value with the intermediate output of the stage of the block cipher algorithm.

17. The apparatus of claim 16, wherein the processor being configured to combine the weight adjustment value with the intermediate output of the at least one stage of the block cipher algorithm is further configured to:
concatenate the output of the weight adjustment value with the intermediate output of the at least one stage of the block cipher algorithm.

18. A non-transitory, computer-readable medium, having stored thereon computer-readable instructions for securing data, comprising instructions configured to cause a computing device to:
apply a block cipher algorithm to an input data to generate a cryptographic output, wherein the block cipher algorithm comprises at least one stage that generates an intermediate output used to generate the cryptographic output, and wherein the instructions configured to cause the computing device to apply the block cipher to input data further comprise instructions configured to cause the computing device to modify the intermediate output of the at least one stage of the block cipher algorithm such that the intermediate output of the stage of the block cipher algorithm has a Hamming weight selected based on a number of bits of the intermediate output of the stage of the block cipher algorithm, to modify the intermediate output of the at least one stage of the block cipher algorithm further comprises determining the Hamming weight of the intermediate output of the at least one stage of the block cipher algorithm, and to determine a weight difference between the Hamming weight of the intermediate output of the at least one stage of the block cipher algorithm and an output weight value; and
output the cryptographic output.

19. The non-transitory, computer-readable medium of claim 18, wherein the at least one stage of the block cipher algorithm comprises a diffusion stage of the block cipher algorithm.

20. The non-transitory, computer-readable medium of claim 19, wherein the diffusion stage comprises a substitution round, and wherein the instructions configured to cause the computing device to modify the intermediate output of the diffusion stage further comprise instructions configured to cause the computing device to modify the intermediate output of the substitution round to have the Hamming weight selected based on the number of bits of the intermediate output of the stage of the block cipher algorithm.

21. The non-transitory, computer-readable medium of claim 18, further comprising instructions configured to cause the computing device to:
determine a weight adjustment value having a Hamming weight equal to the weight difference; and
combine the weight adjustment value with the intermediate output of the at least one stage of the block cipher algorithm.

22. The non-transitory, computer-readable medium of claim 21, wherein the instructions configured to cause the computing device to combine the weight adjustment value with the intermediate output of the at least one stage of the block cipher algorithm further comprise instructions configured to cause the computing device to:
concatenate the weight adjustment value with the intermediate output of the at least one stage of the block cipher algorithm.

* * * * *